M. C. WHITE & O. C. DURYEA.
ELECTROHYDRAULIC POWER APPLIANCE.
APPLICATION FILED MAY 29, 1909.
1,088,002.
Patented Feb. 24, 1914.
5 SHEETS—SHEET 4.
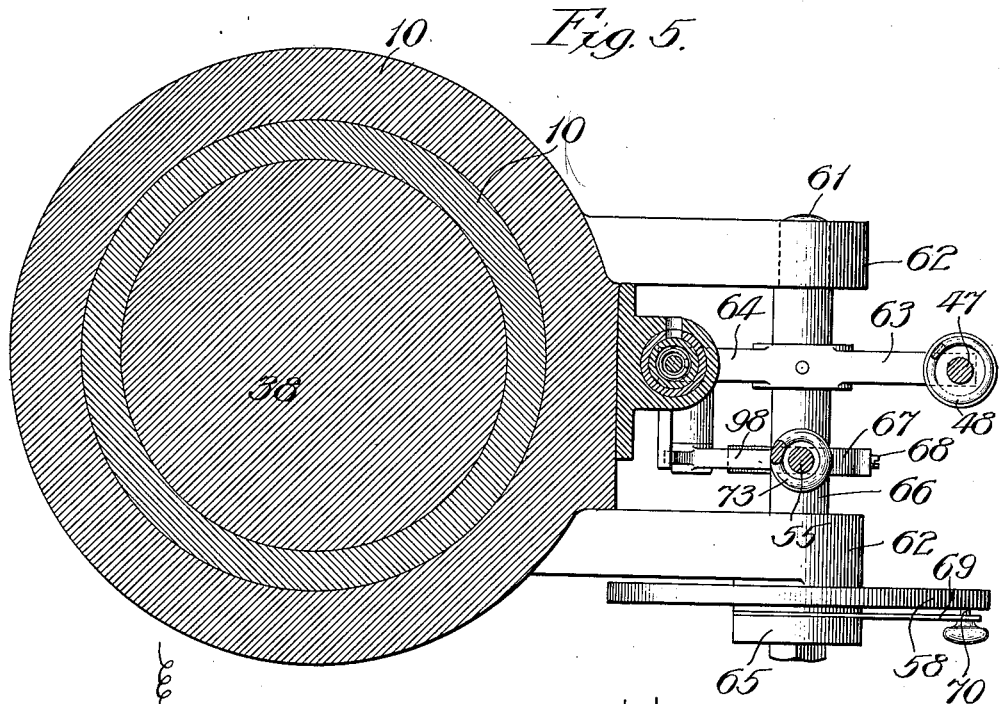
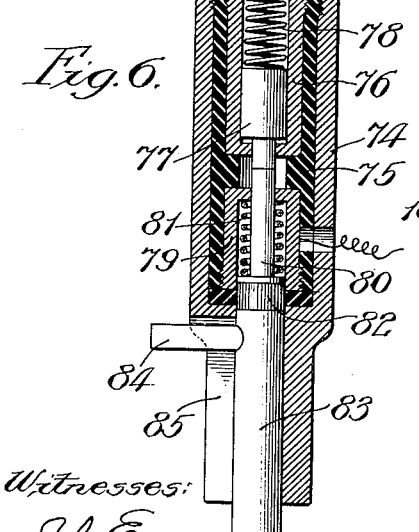
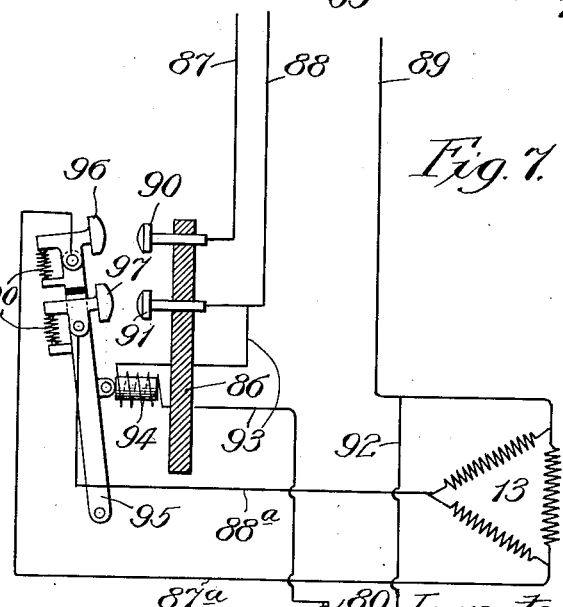
Witnesses:
John Enders
Chas. H. Buell
Inventors:
Morris C. White &
Otho C. Duryea,
By Dyrenforth, Lee, Chritton & Wiles
Attys.

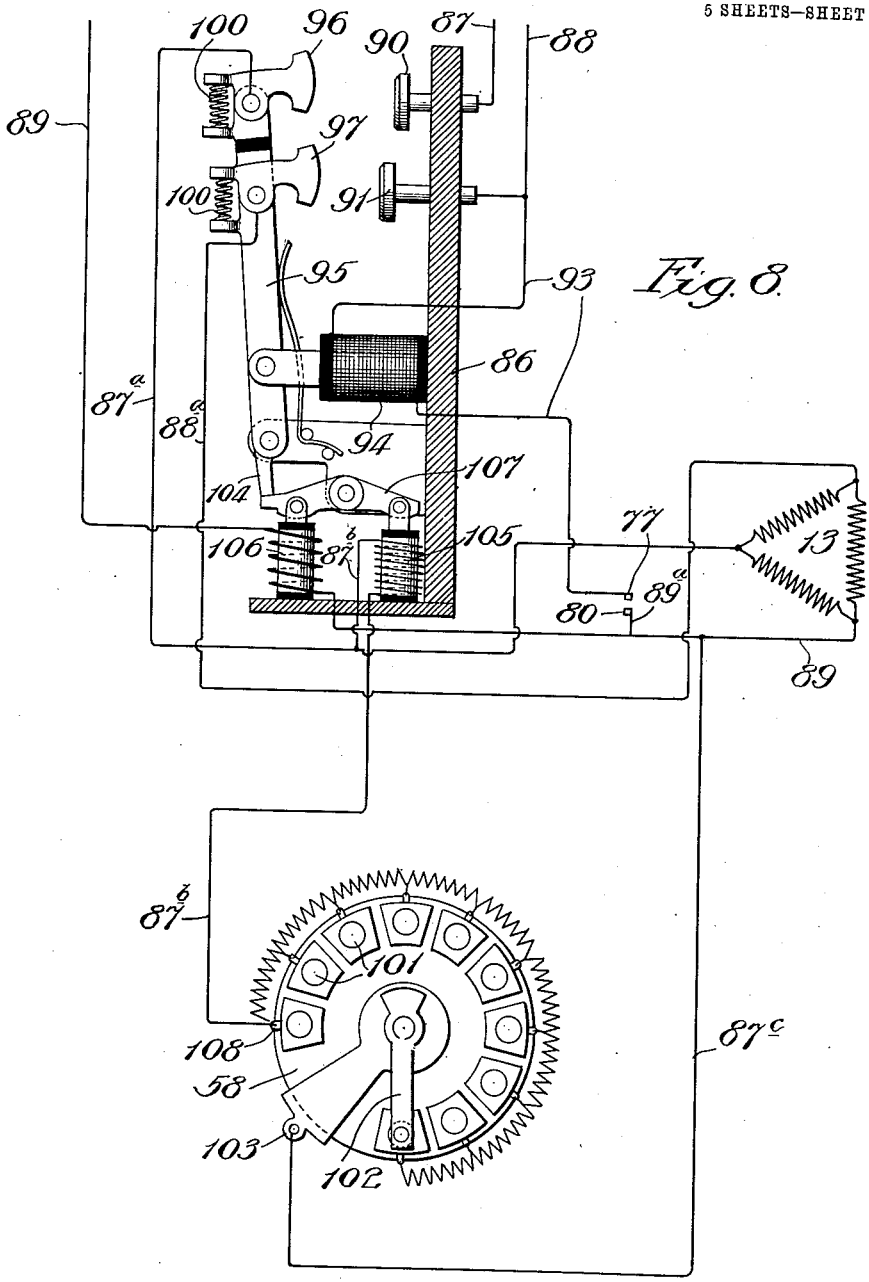

UNITED STATES PATENT OFFICE.

MORRIS C. WHITE AND OTHO C. DURYEA, OF LOS ANGELES, CALIFORNIA.

ELECTROHYDRAULIC POWER APPLIANCE.

1,088,002.  Specification of Letters Patent.  Patented Feb. 24, 1914.

Application filed May 29, 1909. Serial No. 499,145.

*To all whom it may concern:*

Be it known that we, MORRIS C. WHITE and OTHO C. DURYEA, citizens of the United States, residing at Los Angeles, in the county of Los Angeles and State of California, have invented a new and useful Improvement in Electrohydraulic Power Appliances, of which the following is a specification.

Our object is to provide an improved tool-actuating hydraulic or, and more particularly, electro-hydraulic power appliance, of a type wherein a tool, or work-performing member, is intended to accomplish, more especially, a complete operation, such, for example, as the setting of a rivet, under great pressure, in a single progressive movement.

In carrying out our invention, we provide the appliance in the form, preferably, of a self-contained device having a frame, a hydraulic cylinder equipped with a tool-actuating piston, an electric motor, a liquid reservoir, a pump actuated by the motor for forcing liquid from the reservoir into the cylinder, means for regulating the pressure of the liquid against the piston, thereby to regulate the pressure of the tool, or work-performing member, in each instance, means for causing the pump to stop on the completion of each work-performing operation of the tool, and other features of construction which render the apparatus quickly responsive and under perfect control of the operator.

Our invention is applicable to shearing, pressing, briqueting, die-operating, and other machines wherein work-performing pressure may be generated and applied to a tool, or work-performing member, in the same general way; and in the accompanying drawings we show our improvements embodied in a portable electro-hydraulic riveter.

Figure 1:
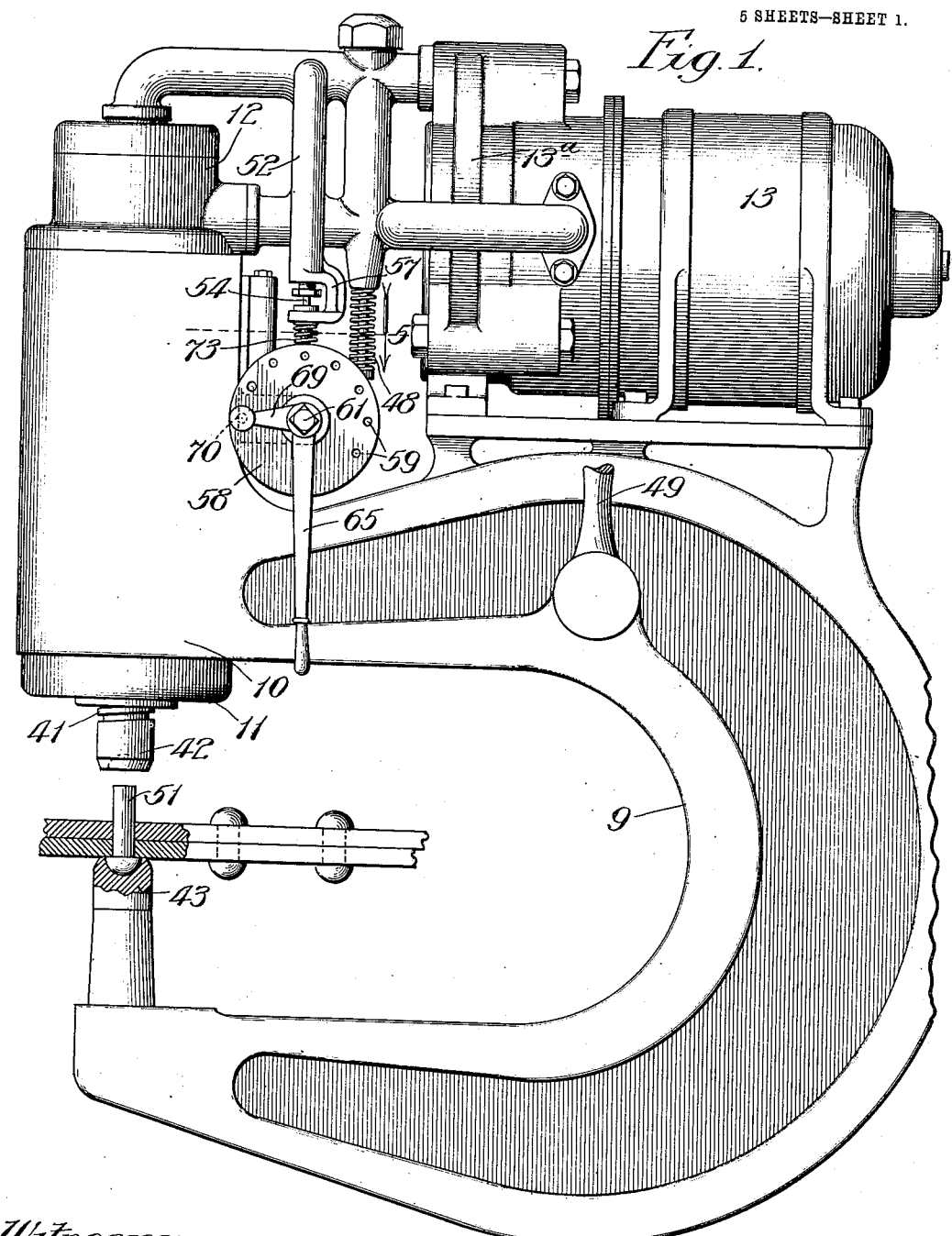
Figure 2:
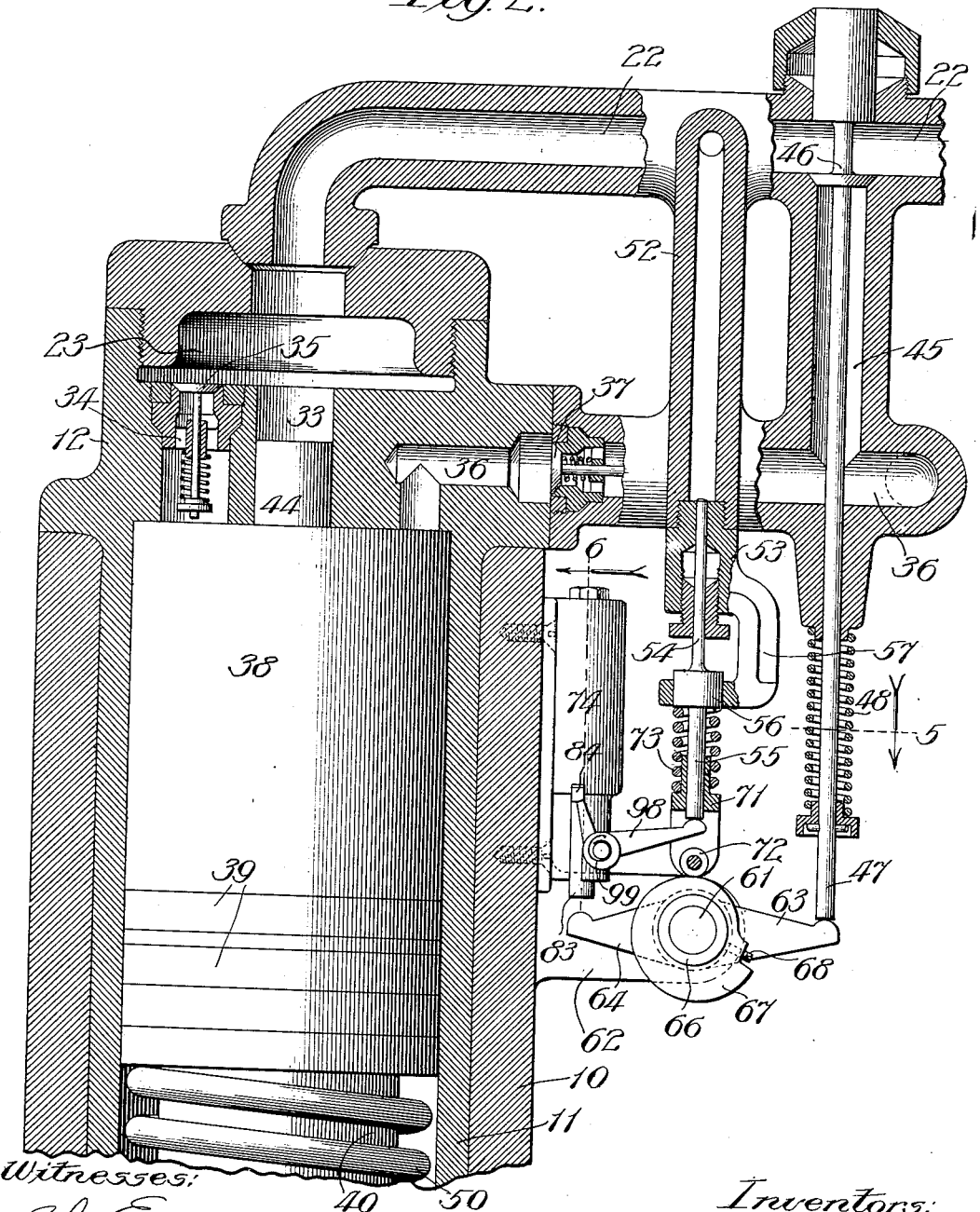
Figure 3:
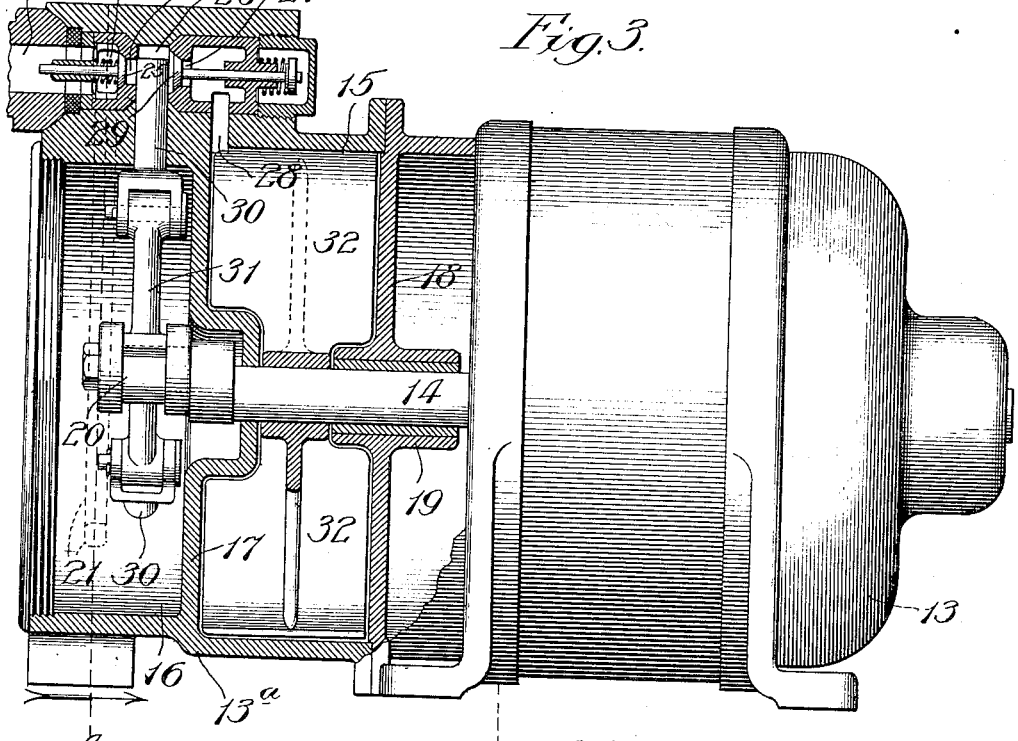
Figure 4:
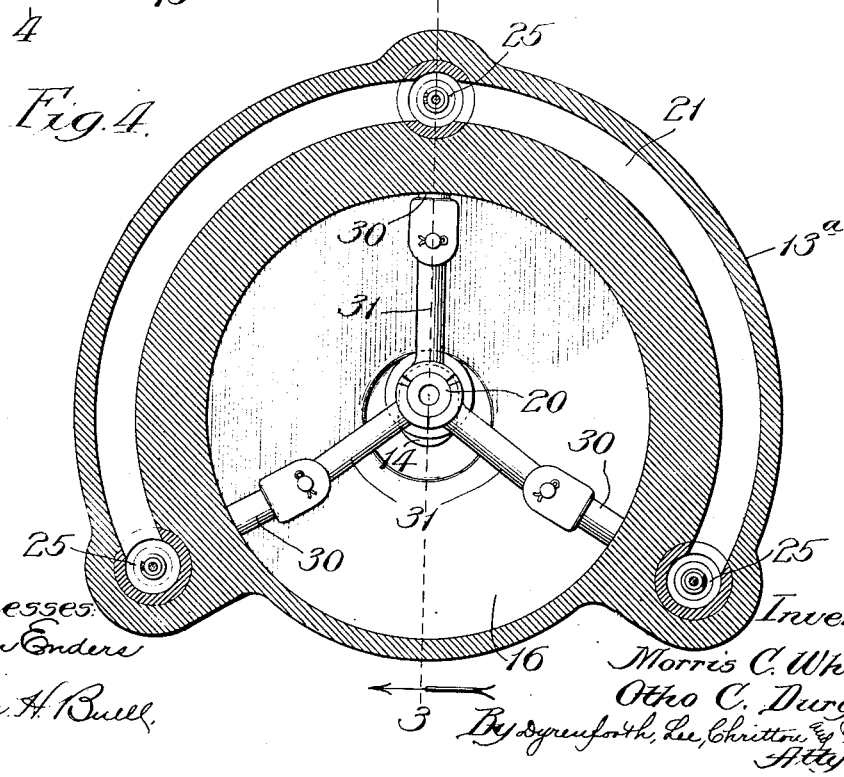

Referring to the drawings Figure 1 is a partly broken side elevation of the apparatus in one preferred form; Fig. 2, an enlarged broken sectional view of one end-portion of the hydraulic cylinder and adjacent parts; Fig. 3, a similar view showing the pump and a pump-feeding impeller, the section being taken on line 3 in Fig. 4; Fig. 4, a section on line 4 in Fig. 3; Fig. 5, an enlarged section on line 5 in Fig. 1, corresponding with line 5 in Fig. 2; Fig. 6, a fragmentary section on line 6 in Fig. 2; Fig. 7, a sectional diagram of a motor-switch and an electric-circuit for the motor-controlling means illustrated in previous figures; and Fig. 8, a view similar to Fig. 7, but illustrating means for stopping the pump, when the pressure of the pumped liquid approximates a predetermined limit, through the consequent building up of the motor-actuating electric current.

Integral with the yoke-frame 9 is the outer shell-portion of a cylinder 10 fitted with a liner 11 integral with the cylinder-head 12. Mounted upon the yoke-frame is an electric motor 13, of which 14 is the armature-shaft. Forming an extension of the motor-casing is a casing 13ᵃ containing chambers 15 and 16 separated from each other by a diaphragm 17, the chamber 15 being separated from the motor-casing chamber by a diaphragm 18. The motor-shaft 14 has a bearing 19 at the center of the diaphragm 18 and passes through an opening in the diaphragm 17 to the chamber 16, where it carries a crank 20. Cored in the casing 13ᵃ, at the outer side of the chamber 16, is a segmental passage 21 communicating through a passage 22, on one side, with a chamber 23 in the cylinder-head 12 and having, in its opposite side, three ports 24 equipped with check-valves 25. Said ports are equidistant apart and communicate with the three radial pump cylinders 26. The pump-cylinders communicate through ports 27 and passages 28 with the chamber 15, the ports 27 being equipped with pump-induction valves 29. Working in the cylinders 26 from the chamber 16 are three radial pump-pistons 30 connected by connecting rods 31 with the crank 20. The chamber 15 forms a reservoir which is supplied with an incompressible liquid, such as a suitable oil or aqueous solution of glycerin, the pump operating to draw the liquid through the ports 27 and discharge it through the ports 24 into the passage 21 and thence through the passage 22 to the chamber 23. Mounted on the shaft 14 in the chamber 15 are radial vanes 32 operating as an impeller to force the liquid under pressure from the chamber 15 to the pump-cylinders. Extending from the chamber 23 to the interior of the cylinder 10 is a port, or reduced cylinder-extension, 33. In the cylinder-head 12 is a return-passage 34 extending to the cylinder-chamber 23 and equipped with a check-valve 35; and also extending from the interior of the cylinder 10 to the chamber 15 is a passage 36 provided, in the position shown, with a check-valve 37.

38 is a piston working in the liner 11 and provided with piston-rings 39. The stem 40 of the piston passes through the end of the cylinder and contains a threaded socket to receive the threaded shank 41 of an adjustable tool, or work-performing member, 42, which, in the present instance, is a rivet-upsetting die coöperating with a similar die 43 carried by the yoke-frame 9. Adapted to fit and work in the cylinder-extension 33 is a short piston-extension 44. Extending from the passage 36 to the passage 22 is a passage 45 normally closed at the passage 22 by a cylinder-exhaust valve 46 on a stem 47. The stem passes through the casing, as shown, and is held normally in the position of closing the valve 46 by a spring 48.

The operation of the parts thus far described is as follows: When the motor is started, the pump-pistons 30, which are directly connected with the motor-shaft at the crank 20 to operate at the same speed as the motor, draw the liquid through the ports 27 and discharge it, as before stated, through the passage 22 into the chamber 23 and cylinder-extension 33. The blades 32 of the impeller mechanism force the liquid through the ports 27 under pressure, whereby the pump is caused to work at its full capacity when running at high speed and at whatever angle the appliance may be. It is to be understood that, as is usual in appliances of this character, of the portable type, the yoke-frame is suspended in a bail 49. The pressure of the liquid is first exerted against the piston-extension 44 in the cylinder-extension 33. A return-spring 50 in the lower part of the cylinder 10 tends to maintain the piston 38 and tool carried thereby in the raised positions indicated in Figs. 1 and 2. The tool 42 is so adjusted by the threaded stem 41 that it will engage the rivet 51 when the piston-extension leaves the cylinder-extension 33. During the movement of the piston before the piston-extension leaves the cylinder-extension, liquid to fill the space, as it is created between the piston and cylinder-head, enters through the passage 36, under pressure of the impeller blades 32, opening the check-valve 37. As soon as the piston-extension clears the cylinder-extension 33, the force of the incoming liquid is exerted against the entire upper surface of the piston and piston-extension to press the tool against the rivet and set the latter. Means are provided for automatically stopping the operation of the pump, as hereinafter explained, when movement of the tool is completed. Raising of the stem 47 against the resistance of the spring 48 opens the exhaust-valve 46, thereby permitting the liquid confined in the cylinder 10 to be returned under the force of the piston-returning spring 50, through the passages 34, 22, 45 and 36 to the reservoir, or chamber, 15.

Communicating with the passage 22, between the pump and chamber 23, is a small cylinder 52 closed at its end by a stuffing-box 53 through which works a small piston or movable abutment 54 having a stem-portion 55. Between the piston 54 and the stem 55 is an enlarged cylindrical part 56 movable through a guide formed in a bracket 57. Mounted against the frame, in the position shown, is an exposed dial-plate, or disk, 58 having a series of perforations, or pin-holes, 59. Extending through the center of the dial-plate is a short shaft 61 journaled in the brackets 62 shown in Fig. 5. Pinned to the shaft 61 is a cross-piece forming arms 63, 64 having rounded ends. The shaft 61, at the outer side of the dial, carries the operating handle 65. Loosely surrounding the shaft 61 and extending through to the outer side of the dial-plate is a sleeve 66 carrying a cam 67 which is adjustably fastened thereto by means of a set-screw 68. The sleeve is provided beyond the dial with an operating-handle 69 carrying a spring-plunger-pin 70, of common construction, adapted to enter the perforations 59. The arm 63 extends beneath the stem 47, as shown in Fig. 2. Loosely surrounding the lower end-portion of the valve-stem 55 is a sleeve-piece 71 having a bifurcated extension provided with a roller 72. Confined between the bracket 57 and the sleeve 71 is a spring 73, of known tension, which operates to press the roller 72 upon the cam 67. The spring 73 operates normally to hold the piston 54 in the position indicated in Fig. 2.

Mounted upon the side of the cylinder 10 is a casing 74 containing a bushing 75 of insulating material (see Fig. 6). Fitting into one end of the bushing is a sleeve 76 containing a plunger-contact 77 pressed normally against the end-portion of the sleeve by a spring 78. Also in the insulated bushing is a sleeve-piece 79 containing a plunger-contact 80 held normally out of contact with the plunger 77 by a spring 81. The plunger 80 bears against a cylindrical block 82 of insulating material on the end of a stem 83 having a laterally-projecting lug 84 movable in a guide-slot 85 in the casing 74. The stem 83 is in the path of the arm 64, as shown in Fig. 2.

In Fig. 7, 86 is a switch-board of insulating material secured in any convenient position. 87, 88, 89 are the feed-wires from a tri-phase electric current-supplier. The wire 89 leads directly to the motor 13, and the wires 87, 88 extend to contact terminals 90, 91 on the switch-board. A shunt-wire 92 connects the wire 89 with the contact 80 before described; and a shunt-wire 93 extends from the wire 88 to the contact 77, also before described. Interposed in the shunt-wire 93 is a solenoid 94, having a core connected to a switch-lever 95 carrying the yielding contacts 96, 97 insulated from each other and connected by the wires 87ª, 88ª, with the motor 13. Pivoted to the casing 74 (see Fig. 2) is a swinging latch 98 in the form of a bell-crank lever having an arm extending into the path of the piston-stem 55 and an arm adapted to slide under and engage the lug 84 carried by the stem 83, as indicated. The pressure exerted by the pumped liquid against the piston 38 is also exerted against the end of the small piston 54 in the cylinder 52. Movement of the piston 54 under said pressure is resisted by the spring 73 and the tension of the said spring is regulated by the cam 67. The tensioning position of the cam can be varied, within desired limits, by means of the handle 69, by turning the latter into register with the progressive pin-openings 59 in the dial-plate 58. The pin-openings designate the amount of resistance which the small piston 54, under the force of the spring 73, will withstand before yielding under the liquid pressure, and the operator, knowing what pressure per square inch is to be exerted against a rivet 51, of the diameter employed, to upset it, turns the handle 69 to the proper pin-opening 59.

The device is started to set a rivet by turning the handle 65 in the direction to the left in Fig. 1. This causes the arms 64 carried by the handle-shaft 61 to engage the plunger-stem 83 and raise the contact 80 into engagement with the contact 77. This closes the circuit from the wire 88 through the solenoid 94 and the motor-wire 89. The solenoid core is pivotally connected with the switch-lever 95, and drawing upon the same swings it and closes the contacts 96, 90, and 97, 91. The current then passes through the wires 47, 88, 87ª, 88ª and the motor. When the plunger-contact 80 is raised by the arm 64 to engage the contact 77, the latch 98 is turned by a spring 99 beneath the lug 84 at one end and against the stem 55 at its opposite end. Thus, when the operating-handle 65 is swung to its normal position shown in Fig. 1, to release the plunger-contact, the latter is held in engagement with the contact 77 by the latch 98. When the liquid-pressure generated by the pump exceeds the predetermined resistance of the spring 73, it forces the small piston 54 outward, thereby tripping the latch 98 out of engagement with the lug 84 on the plunger-stem 83 and permitting the contact 80 to be forced by the spring 81 out of engagement with the contact 77. This breaking of the circuit through the solenoid 94 permits the switch-lever to open, under the resilience of the springs 100 of the yielding contacts 96, 97, and by gravity, to break the motor-circuit. It will be understood, therefore, that when the work-performing member has completed its work, the motor-circuit is broken, causing the pump to stop, and permitting the work-performing member to be returned to initial position, on the opening of the exhaust valve 46, as before described. In the case of a portable appliance, employed in a shop, the switch-board 86 may be fastened in a remote permanent location, a cable containing the wires 89, 93, 87ª and 88ª extending therefrom to the portable device.

In the construction illustrated in Fig. 8, the automatic stopping of the pump, when the desired liquid pressure against the piston has been reached, is effected indirectly, instead of directly, by the rise of liquid-pressure to the predetermined limit. In this construction, the cylinder 52, small piston 54, spring 73, sleeve-piece 71, roller 72, cam 67 and latch 98 are dispensed with. The dial-plate 58 is equipped with a rheostat provided with graduated contact-points 101 in lieu of the pin-holes 59; the handle 69 carrying a cut-out lever 102 movable into engagement with the contacts 101 and connecting with a terminal 103. The insulated switch-board 86 carries the two contacts 90 and 91, to which the feed-wires 87, 88 extend, a swinging switch-lever 95, and switch-lever-closing solenoid 94 interposed in the shunt-wire 93 leading to the contact 77, all as in the construction before described. On the switch-lever 95 are yielding contacts 96, 97 insulated from each other and operating as before explained. Also on the switch-lever is an extension 104, and secured to the switch-board are two solenoids 105 and 106, the cores of which are connected with a latch 107 pivoted at its center between the solenoids. The winding of the solenoid 105 is interposed in a shunt-wire 87ᵇ extending from the wire 87ª to the terminal 108 of the rheostat. The winding of the solenoid 105 is relatively fine and close. The wire 88ª extends to the motor. The solenoid 106 is interposed in the feed-wire 89 which extends to the motor, the wire at the solenoid 106 being but a few turns of coarse wire, adding no resistance to the line. Connected with the wire 89 is a shunt-wire 89ª leading to the contact 80. A wire 87ᶜ extends from the rheostat terminal 103 to the wire 89.

The operation of the construction last described is as follows: Swinging of the operating-lever 65 causes its arm 64 to move the plunger-contact 80 into engagement with the contact 77, thereby closing the circuit through the solenoids 94, 106. The solenoid 94 operates thus to swing the lever 95 and close the contacts 96, 97 yieldingly against the contacts 90, 91. If the smallest amount of pressure of the work-performing member is required for the operation, as when a small rivet is to be set, the handle 69 should be turned initially to move the lever 102 to the first contact 101, as indicated. This cuts in all the resistance of the rheostat, giving to the solenoid 105 an initial predetermined strength, which, however, exceeds the strength of the solenoid 106 under the normal current through the wire 89. Consequently, immediately that the switch-lever 95 is closed by the solenoid 94, the solenoid 105 operates to swing the latch 107 into the path of the extension 104 of the switch-lever, thereby locking it in its circuit-closing position. After the latch 107 has been swung to lock the switch-lever, as described, which takes place instantly that the contacts 80, 77 are brought into engagement, the operator permits the handle 65 to swing to the intermediate position indicated in Fig. 1 to move the arms 64, 63 to the positions indicated in Fig. 2 and permit the contact 80 to release the contact 77. The closing of the switch-lever 95 causes the motor 13 to operate. As the back-pressure of the pumped liquid increases against the pump, the resistance of the motor increases, thereby necessitating a proportionate increase or building-up of the current through the feed-wires. This building-up of the current through the wire 89 proportionately strengthens the solenoid 106, and when the strength thereof has increased sufficiently to overpower that of the solenoid 105, the latch 107 is swung by the solenoid 106 to disengage the switch-lever extension 104, thereby permitting the switch to open and break the contact through the wires 87, 87ᵃ and 88, 88ᵃ, thus stopping the motor. The maximum predetermined pressure of the pumped liquid, and consequently the maximum predetermined pressure of the working-member, in each operation, is indirectly dependent upon the relative strength of the solenoid 105, which in turn is dependent upon the relative resistance at the rheostat controlled by the position of the lever or handle 69. The solenoid-switch constructions and electric circuits shown in Figs. 7 and 8 are merely for illustration, and so far as the details thereof are concerned, they form no part of the present invention. The liquid pressure in the cylinder will remain after the pump has stopped, and until the operator opens the release-valve 46. Therefore the maximum pressure of the tool against the rivet may be maintained during the cooling of the latter, if desired.

In the construction shown and described, the cylinder 10 is stationary and the differential piston 38, 44 moves to operate the work-performing member. It would be a matter of comparative simplicity to cause the cylinder to be the movable tool-operating member and the piston the stationary member, such a variation being common in cylinder and piston constructions. The apparatus may be of a stationary instead of a portable type and may be variously modified in the matter of details of construction and combinations of parts without departing from the spirit of our invention as set forth in the appended claims.

What we claim as new and desire to secure by Letters Patent is—

1. In a tool-actuating appliance of the character described, the combination of a cylinder and piston, forming parts movable one with relation to the other, a tool holder operatively connected with the moving part, a liquid reservoir, a motor, a pump actuated by the motor to force liquid from the supplier into the cylinder and thus advance the moving part and tool, an impeller actuated by the motor for supplying liquid under pressure from the reservoir to the pump, means actuated by rise of pressure of the pumped liquid to a predetermined limit for stopping further supply of liquid to the cylinder, retracting means for said moving part, and means for returning the liquid from the cylinder to the reservoir.

2. In an electro-hydraulic tool-actuating appliance, the combination of a cylinder and piston, forming parts movable one with relation to the other, a tool holder operatively connected with the moving part, a liquid reservoir, an electric motor, a pump actuated by the motor to force liquid from the reservoir into the cylinder to advance the moving part, a normally open motor circuit, an operating handle movable to close said circuit to start the motor and pump, means actuated by rise of pressure of the pumped liquid to a predetermined limit for stopping further supply of liquid to the cylinder, means under ready control of the operator for varying said limit, retracting means for said moving part, and means under control from the operating handle for returning the liquid from the cylinder to the reservoir.

3. In a machine of the character described, the combination of a cylinder and piston, forming parts movable one with relation to the other, a work-performing member operatively connected with the moving part, a reduced extension on the piston working in a reduced extension in the cylinder, a liquid-supplier, and a pump for forcing liquid from the supplier into the cylinder-extension to discharge the small piston-extension therefrom and then force the liquid into the cylinder against the piston and piston-extension.

4. In a machine of the character described, the combination of a cylinder and piston, forming parts movable one with relation to the other, a work-performing member operatively connected with the moving part, a reduced extension on the piston working in a reduced extension in the cylinder, a liquid-supplier, a pump for forcing liquid from the supplier into the cylinder-extension to discharge the small piston-extension therefrom and then force the liquid into the cylinder against the piston and piston-extension, and means for supplying liquid to the cylinder during movement of the piston while the piston-extension is in the cylinder-extension.

5. In a machine of the character described, the combination of a cylinder and piston, forming parts movable one with relation to the other, a work-performing member operatively connected with the moving part, a liquid-supplier, a pump for forcing liquid from the supplier into the cylinder against the moving part, a pump-operating electric motor, a motor-circuit, relatively movable contacts in said circuit, means under the control of the operator for closing said contacts to start the motor, catch-mechanism for locking said contacts in closed position, and regulable means operating automatically, when the pressure of the pumped liquid in the cylinder approximates a predetermined limit, to release said catch-mechanism and permit said contacts to open and thereby stop the motor.

MORRIS C. WHITE.
OTHO C. DURYEA.

In presence of—
J. G. ANDERSON,
R. A. SCHAEFER.